United States Patent
Soto Losada

(10) Patent No.: US 6,423,655 B1
(45) Date of Patent: Jul. 23, 2002

(54) SELF-CARRYING LINER FOR THE INTERNAL LINING OF VEHICLE CEILINGS

(75) Inventor: Pablo Soto Losada, Burgos (ES)

(73) Assignee: Grupo Antolin-Ingenieria, S.A., Burgos (ES)

( * ) Notice: Subject to any disclaimer, the term of this patent is extended or adjusted under 35 U.S.C. 154(b) by 0 days.

(21) Appl. No.: 09/297,630

(22) PCT Filed: Sep. 17, 1997

(86) PCT No.: PCT/ES97/00227

§ 371 (c)(1),
(2), (4) Date: Jun. 14, 1999

(87) PCT Pub. No.: WO99/14080

PCT Pub. Date: Mar. 25, 1999

(51) Int. Cl.⁷ ................................. D04H 1/54
(52) U.S. Cl. .................. 442/409; 428/74; 428/213; 52/83; 52/91.1; 296/98; 296/214
(58) Field of Search .................. 442/409; 428/213, 428/74; 52/83, 91.1; 296/98, 214

(56) References Cited

U.S. PATENT DOCUMENTS

| | | | |
|---|---|---|---|
| 4,946,738 A | * 8/1990 | Chenoweth et al. | ........ 422/284 |
| 5,068,001 A | * 11/1991 | Haussling | ................ 156/222 |
| 5,298,319 A | * 3/1994 | Donahue et al. | ........... 428/284 |
| 5,853,843 A | * 12/1998 | Patel et al. | ................. 428/116 |
| 5,888,616 A | * 3/1999 | Ang | ........................... 428/141 |
| 6,008,149 A | * 12/1999 | Copperwheat | .............. 442/381 |
| 6,156,682 A | * 12/2000 | Fletemier et al. | ........... 442/394 |

FOREIGN PATENT DOCUMENTS

| | | |
|---|---|---|
| EP | 584445 | 3/1994 |
| EP | 605235 | 7/1994 |

* cited by examiner

*Primary Examiner*—Terrel Morris
*Assistant Examiner*—Arti R. Singh
(74) *Attorney, Agent, or Firm*—Ladas & Parry

(57) ABSTRACT

The liner is formed by a "support" structure and an outer or decorative liner layer. The "support" structure consists of three superimposed layers made of polyester fibers, where the middle layer (1) is considerably thicker than the outer layers (2), while the decorative layer (3) is of a polyester liner or of another suitable material, allowing recycling of the entire set. The different layers are attached to each other by pre-heating layers (1) and (2) and the corresponding molding of the "support" formed by these, including the outer or decorative layer (3), without requiring any further adhesive to keep said layers joined.

3 Claims, 1 Drawing Sheet

SELF-CARRYING LINER FOR THE INTERNAL LINING OF VEHICLE CEILINGS

OBJECT OF THE INVENTION

The invention relates to a liner to be used as internal lining for vehicle roofs, self-supporting and made of several layers, all but one of them acting as liner support, the other as an outer decorative layer. The set of three layers is a sandwich with good stiffness properties to make it self-supporting.

The object of the invention is to provide a single block liner, that is, a single-component one, so that the layers which make up the self-supporting structure are joined to each other by pre-heating and the set of them is molded to the outer decorative layer, of a pleasant look and feel.

BACKGROUND OF THE INVENTION

The internal lining of vehicle roofs generally requires use of a liner material which is self-supporting, adapts easily to the diverse shapes of different roofs, is lightweight and in addition provides a pleasant external feel and look, also requiring good sound absorption properties to improve inner comfort.

In order to fulfill these requirements, the use of multimaterial liners is generally resorted to, in which the different materials are arranged in thin layers glued to each other, so that each layer provides its characteristics to the resulting set or sandwich.

A common configuration used consists of a first layer, in contact with the roof, made of a liner material, to which is adhered a second layer consisting of a fiberglass grid or mesh, these layers being joined to each other by glue. Over the fiberglass grid or mesh is placed a substantially thicker central layer, on top of which is another fiberglass grid or mesh, glued to a final outer layer which is the accessible layer of the lining, this last layer made of a lightweight material.

These materials have certain drawbacks, mainly resulting from the use of a fiberglass mesh, with the well-known handling problems. Furthermore, since the layers are made of very different materials, recycling is difficult, and in addition there is the problem of using adhesives to join the different layers, all of this making the manufacturing process cumbersome.

DESCRIPTION OF THE INVENTION

The proposed liner, while maintaining the sandwich type structure described above, solves the aforementioned problems by having the "support" block consist of three layers made of polyester fibers, keeping the final outer layer made of a lightweight material, so that these three polyester fiber layers perform the same function as the fiberglass and polyurethane foam layers normally used in manufacturing conventional self-supporting roof linings The set of three polyester fiber layers is a sandwich with good stiffness properties, enabling the lining to be self-supporting and to comply with demands of vehicle manufacturers, in addition showing optimum acoustical properties.

Thus, the novelty of the invention lies in the composition of the three "support" layers in the simple manufacturing process for the liner resulting from the use of these materials, since as they are polyester fibers the final product can be considered to be single-component, as the decorative layer is usually also made of polyester, having the advantage that the liner as a whole can be easily recycled, also eliminating the layers of adhesive required in traditional linings to join the different layers which make up the support structure.

The process for obtaining the liner is based on preheating the three "support" layers, with a simultaneous molding of this support with the decorative layer, until the final shape of the liner is obtained.

The polyester fibers which make up the layers of the liner support structure, according to the invention, are of the type known as "short".

Regarding the polyester fiber layers in question, two of them are identical, composed of 100% short thermo-fusing polyester fibers with a low melting point, while the third layer, placed between the other two, is considerably thicker and, although it is also made of polyester fibers, has a different composition since thermofusing polyester fibers with a low melting point, solid fibers and hollow fibers can all be used, in different proportions and with different properties. This layer is made in the normal manner in manufacturing padding or fleece for filling clothing items or stuffing in the furniture industry, giving the final liner excellent sound absorption properties. These layers can have a greater or lesser grammage depending on the maximum final thickness required of the lining.

DESCRIPTION OF THE DRAWINGS

As a complement of the description in progress and in order to aid a better understanding of the properties of the invention, according to an example of a preferred embodiment of the same, as an integral part of the description, a single sheet of drawings is attached in which with an illustrative and non-limiting nature and in its only figure a schematic representation is made of the arrangement of the three layers which make up the self-supporting liner object of the invention.

PREFFERED EMBODIMENT OF THE INVENTION

Figure 1:
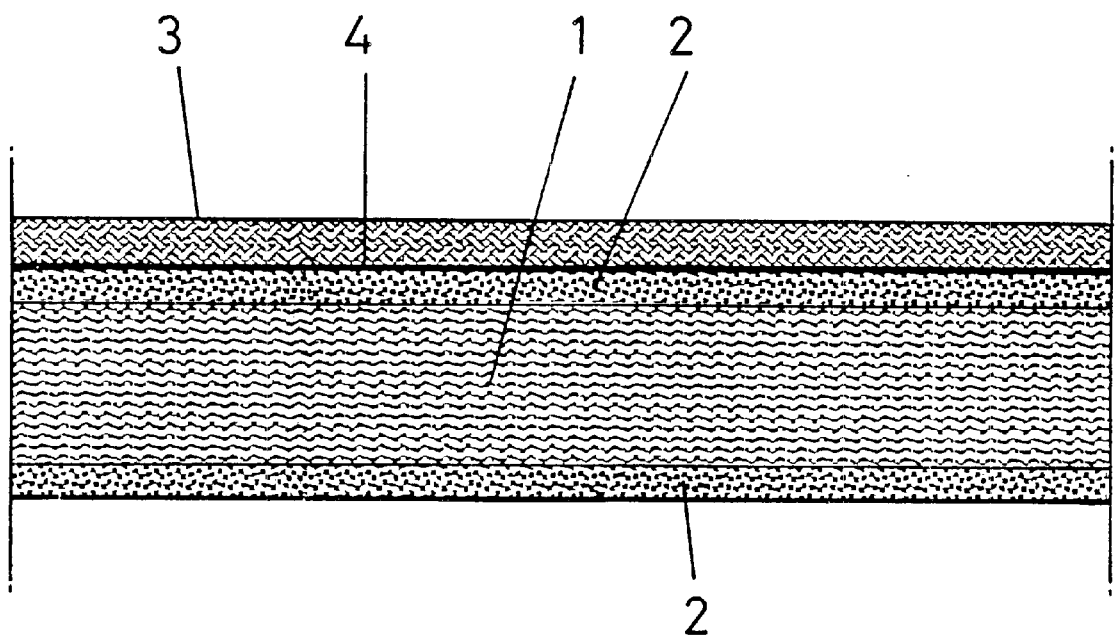

As seen in the aforementioned figure, the liner of the invention includes a thick central layer (1), made of several types of short polyester fibers, such as thermofusing fibers, solid fibers and hollow fibers. On either face of this central layer (1), making up what is known as "fleece", two identical layers (2) are placed, made of short thermofusing fibers, thus forming a block or sandwich consisting of the outer layers (2) and the inner layer (1), joined to each other as described below.

These three layers make up what is known as the "support" structure, complemented by the decorative layer of a pleasant look and feel, which is made of a layer of lightweight fabric (3), or any suitable material, which depending on its composition may need melting film or additional glue (4).

Union of layers (1) and (2) to each other is achieved by pre-heating the set at a temperature which melts the low-melting point thermofusing fibers which make up these layers (1) and (2), thus managing to adhere them to each other and therefore joined. Afterwards outer or decorative layer (3) is added, molding the set below the melting point of the fibers, in this way obtaining a roof lining which remains solid as a single-component element in the final shape required.

Grammage of central layer (1) shall depend on the thickness required for the lining to be obtained, while grammage of layers (2) shall be lower and depend on the mechanical and thermal requirements of the final product.

What is claimed is:

1. A self-supporting liner for the internal lining of vehicle roofs consisting of a sandwich structure with support functions having an outer layer (3) forming the decorative surface of the liner itself, wherein the support structure consists of three superimposed layers of low melting thermofusing short polyester fibers, wherein the middle layer (1) consists of short thermofusing polyester fibers having a low melting point, solid polyester fibers, hollow polyester fibers or a combination thereof, outer layers (2) consisting of short polyester fibers also having a low melting point; layers (1) and (2) being joined by fusing the polyester fibers by a preheating process; and optionally attaching the decorative layer to the support layer (2) by melting a film or by an adhesive.

2. A self supporting liner for the internal lining of vehicle roofs as claimed in claim 1, wherein the outer layer (3) or liner which forms the decorative surface is made of a lightweight fabric and is incorporated into the block formed by the support layers (1) and (2), during the liner shaping process, after the corresponding pre-heating of the support made up of the three Layers (1) and (2).

3. Self-supporting liner for internal lining of vehicle roofs, as claimed in claim 1, wherein the grammage of the middle layer (1) is greater than that of layers (2), depending for the former on the thickness of the liner to be obtained and for the latter on its mechanical and thermal requirements.

* * * * *